Patented Oct. 6, 1953

2,654,770

UNITED STATES PATENT OFFICE 2,654,770

PROCESS FOR PREPARATION OF ALKYL TITANATES

Daniel F. Herman, Queens, N. Y., assignor to National Lead Company, New York, N. Y., a corporation of New Jersey No Drawing. Application June 22, 1951, Serial No. 233,111

9 Claims. (Cl. 260—429)

This invention relates to a method for preparing metallo-organic compounds. More specifically, this invention relates to a method for preparing alkyl titanates.

Many methods have been proposed and employed for the preparation of alkyl titanate. Among such known methods is one in which titanium tetrachloride is reacted with an alcohol in the presence of ammonia in which the reaction is carried out in the presence of a large excess of alcohol. In such a reaction, the ammonium chloride formed is crystallized from solution and must be filtered from the alcoholic solution containing the alkyl titanate. Such a filtration is difficult to employ since the filtration must be carried out in a closed system. This filtration step results in an expensive process due to the handling losses involved and the absorptive characteristics of the crystals formed.

An object of this invention, therefore, is to prepare alkyl titanates by a process which eliminates the filtration of the alkyl titanates from the ammonium chloride formed. A further object is to provide a process which is easy to operate and economical to employ. These and other objects will become apparent from the following more complete description of the present invention.

Broadly this invention contemplates a method for preparation of alkyl titanate which comprises admixing alcohol, titanium tetrachloride, and ammonia thereby to form liquid alkyl titanate and ammonium chloride, and containing said ammonium chloride in a nitrogenous liquid selected from the group consisting of amides and nitriles and separating from each other liquid alkyl titanate and the nitrogeneous liquid containing the ammonium chloride.

The titanium tetrachloride, alcohol, ammonia and nitrogenous liquid may be added to each other in any order, but it is preferred to first admix the titanium tetrachloride with the alcohol and the ammonia with the nitrogenous liquid and then to combine the two mixtures. Upon the addition of titanium tetrachloride to alcohol a reaction takes place which releases a quantity of hydrogen chloride and it is desirable to remove as much of the liberated hydrogen chloride from the mixture as possible before adding the ammonia. This may be accomplished by subjecting the mixture of titanium tetrachloride and alcohol to the action of a stream of non-reacting gas such as dry air by passing the gas through the mixture to sweep out a portion of the HCl released. The removal of HCl by such a procedure lowers the quantity of ammonium chloride formed which simplifies the separation problems. It has been found that up to about 50% of the theoretical amount of HCl produced may be removed by this procedure. The nitrogenous liquid may also be present in the mixture if desired during the gas treatment without substantially any effect.

Substantially any aliphatic amide or nitrile may be employed providing it contains no more than about 3 carbon atoms per nitrogen atom. The amount of amide or nitrile added may vary considerably but it is preferred to add sufficient to either dissolve the ammonium chloride formed or to form a relatively thin slurry with the undissolved ammonium chloride which may be easily handled.

Ammonia must be added in a quantity sufficient to react with substantially all of the chloride content in the mixture. In order to insure the presence of a sufficient quantity of ammonia, it is convenient to pass ammonia gas through the solution throughout the course of the reaction thus keeping the solution constantly saturated with ammonia.

While this invention is useful in the preparation of titanates from most alcohols that have 2 or more carbon atoms in the molecule, it is particularly advantageous to employ the process of the instant invention for the preparation of titanates of alcohols having from 2 to 20 carbon atoms. It is particularly desirable to use primary or secondary mono-hydric non-substituted aliphatic alcohols. The use of a moderate excess of alcohol, say 25%, over the stoichiometric quantity tends to improve the yield somewhat. However, for most purposes, a small excess for example about 5% or even stoichiometric amounts of alcohol may be employed with satisfactory results.

Substantially any compound which falls within one of the groups may be employed as a constituent in the process of this invention, but it is desirable to choose those which produce separate layers in order to simplify the separation of the alkyl titanate formed from the other products present from the reaction. It has been found that formamide is particularly desirable to employ because the ammonium chloride formed is soluble in this particular compound. In such case the ammonium chloride formed is dissolved in the amide layer and therefore the alkyl titanate layer may be easily separated from the amide layer containing the dissolved ammonium chloride. When employing nitriles or other amides the ammonium chloride is insoluble and is therefore present in the mixture as a crystalline product. When the ammonium chloride is insoluble in the amide or nitrile layer it is desirable although not essential to select amides or nitriles which are more dense than the alkyl titanate layer. This results in the insoluble ammonium chloride being present as a crystalline product in the amide or nitrile layer, i. e. present in the more dense layer.

The densities of both the alkyl titanate and the amide or nitrile layer depend upon the type of compounds present. Generally speaking with respect to the alkyl titanate the density decreases as the molecular weight increases and the density of the amide or nitrile layer also decreases as molecular weight increases.

If the alkyl titanate layer is more dense than the amide or nitrile layer, and if the ammonium chloride formed is insoluble in the amide or nitrile layer, the ammonium chloride will be present as a crystalline product in the alkyl titanate layer which is undesirable. Under these circumstances however, it is a simple matter to change the density of one of the two layers in order to make the layer containing the alkyl titanate less dense than the layer containing the amide or nitrile by adding a solvent of low density which is miscible with the alkyl titanate and immiscible with the amide or nitrile. Such a solvent which may be employed for this purpose is petroleum ether. When used for this purpose the alkyl titanate layer containing the petroleum ether rises to the top of the mixture and forms an upper layer; the more dense amide or nitrile layer is present as the lower layer. In such an instance the solid ammonium chloride will be dispersed in the amide or nitrile layer, that is the more dense layer, and therefore the upper layer containing the alkyl titanate and petroleum ether may be easily removed by decantation. The densities of the alkyl titanate layer and the amide or nitrile layer may vary considerably upon the particular titanate prepared, the particular amide or nitrile used and upon the solubility of the ammonium chloride in the amide or nitrile layer. When the densities of the two layers are very similar, separation by gravity becomes more difficult. It has been found, however, that the two layers formed by the reaction may be readily separated by gravity or other simple means if a difference of at least 0.01 gram/cc. between their respective densities is maintained. One of the possible means for maintaining this difference, if it does not normally exist, has been discussed above.

The alkyl titanate product may be purified, if desired, by distillation or other ordinary means. When it is distilled, or if for any other reason it is desired to heat the alkyl titanate it is preferable to carry out the heating after the ammonium chloride has been removed, since heating in the presence of ammonium chloride may result in undesirable reactions of the alkyl titanate with the ammonium chloride.

All of the starting materials used should preferably be completely anhydrous since the presence of moisture causes hydrolysis of the titanium compounds and consequently results in lower yields.

In order to more fully illustrate the instant invention the following examples are presented.

*Example I*

In order to prepare tetra (2-ethylbutyl) titanate, 95 parts of titanium tetrachloride were added over a period of 30 minutes to 204 parts of 2-ethyl- butanol. Artificial cooling by means of an ice bath was employed and the mixture was agitated throughout the addition period. When the addition was complete a stream of dry air was bubbled through the mixture for a period of 4 hours at room temperature (about 22° C.) The air-blown mixture was analyzed and found to contain 15.6% titanium calculated as $TiO_2$ and 24.2% chlorine indicating that 13% of the theoretical amount of HCl formed by the reaction between the $TiCl_4$ and the alcohol had been removed.

120 parts of this mixture were added over a period of 30 minutes to a vessel containing 500 parts of formamide saturated with ammonia gas. The vessel was cooled by means of a water bath. During the addition the mixture was rapidly agitated and ammonia gas was added throughout the addition period and for an additional 30 minute period thereafter in order to keep the system continuously saturated with ammonia. At the end of the addition period the contents in the vessel were present as two layers. The top layer was tetra (2-ethylbutyl) titanate and the bottom layer was formamide and ammonium chloride dissolved therein. The density of the titanate layer was 0.955 gram/cc. while the density of the formamide containing the ammonium chloride was 1.185 grams/cc. The layers were separated from one another by gravity and the upper layer consisting essentially of tetra (2-ethylbutyl) titanate was distilled under reduced pressure and gave a product which was practically pure tetra (2-ethylbutyl) titanate.

*Example II*

380 grams of titanium tetrachloride were added to 592 parts of n-butanol according to the procedure described in Example I. Dry air was bubbled through the mixture for 8 hours at room temperature. The mixture was then analyzed and was found to contain 18.0% titanium calculated as $TiO_2$ and 22.2% chlorides indicating that 31.5% of the theoretical quantity of HCl had been removed. 200 grams of this mixture were admixed with 13.3 grams of additional n-butanol in order to give a 10% excess of butanol. The whole was then added over a period of 30 minutes to a vessel containing 275 parts of dimethylformamide saturated with ammonia. The exterior of the vessel was cooled by means of a water jacket to keep the temperature of the contents below 30° C. Ammonia gas was bubbled throughout the mixture in the vessel throughout the addition period and for an additional 30 minutes thereafter. The contents of the vessel were then allowed to settle, after which they were present in a 3 phase system which consisted of dimethylformamide as the upper layer, tetra n-butyl titanate as the lower layer and solid ammonium chloride crystals contained in the tetra n-butyl titanate lower layer. The density of the upper layer, i. e. dimethylformamide was 0.933 gram/cc. while the density of the lower layer, i. e. tetra n-butyl titanate was 0.990 gram/cc. In order to separate the tetra n-butyl titanate from the ammonium chloride crystals, a solvent of low density which is miscible with the tetra n-butyl titanate and immiscible with the dimethylformamide was employed to reduce the density of the layer containing the butyl titanate. For this purpose 200 parts of petroleum ether were added and the mixture was agitated and allowed to settle once more. The tetra n-butyl titanate and the petroleum ether then formed a homogeneous upper layer having a density of 0.915 gram/cc. while the dimethylformamide formed the lower layer containing the insoluble ammonium chloride crystals. The two liquid phases were separated from one another by decantation and the upper layer containing the tetra n-butyl titanate and the petroleum ether was distilled and tetra n-butyl titanate was recovered in substantially pure state.

Example III 380 parts of titanium tetrachloride were added to 481 parts of isopropanol according to the procedure described in Example I. 200 parts of the resulting mixture were then added over a period of 30 minutes to a container containing 250 parts of oxydipropionitrile saturated with ammonia. The exterior of the vessel was cooled by means of a water jacket to keep the temperature of the contents below 30° C. Ammonia gas was bubbled through the mixture in the vessel throughout the addition period and for an additional 30 minutes thereafter. Ammonia addition was then discontinued and the contents allowed to separate undisturbed. Three phases were present namely, liquid oxydipropionitrile having a density of 1.033 grams/cc. as the lower layer, liquid tetraisopropyl titanate having a density of 0.956 gram/cc. as the upper layer, and insoluble ammonium chloride crystals contained in the oxydipropionitrile layer.

The tetraisopropyl titanate was separated from the liquid oxydipropionitrile containing the ammonium chloride and upon distillation substantially pure tetraisopropyl titanate was obtained.

Example IV 380 parts of titanium tetrachloride were added to 592 parts of n-butanol according to the procedure described in Example I. Air was passed through the mixture for 8 hours at room temperature (about 20° C.). The mixture was then analyzed and found to contain 17.7% $TiO_2$, 20.5% $Cl_2$ indicating a removal of about 35% of the theoretical quantity of hydrochloric acid produced. 200 parts of this air blown mixture were added over a period of 30 minutes to a vessel containing 250 parts of iminodipropionitrile saturated with ammonia. External cooling was employed and ammonia gas was bubbled through the mixture throughout the addition period. At the end of the addition three phases were present in the vessel. The upper layer was iminodipropionitrile, having a density of 0.994 gram/cc., the lower layer tetra n-butyl titanate having a density of 0.998 gram/cc. and ammonium chloride crystals contained therein. Again, in order to separate the tetra n-butyl titanate from the ammonium chloride crystals, 67 parts of petroleum ether were added with agitation to the mixture. The petroleum ether and the butyl titanate formed a homogeneous upper layer having a density of 0.980 gram/cc., while the iminodipropionitrile became the lower layer. The method of separation as described in Example II was employed and after distillation, substantially pure tetra n-butyl titanate was obtained. A yield of 72% based on the weight of titanium tetrachloride introduced was obtained.

Example V

The procedure described in Example IV was repeated except that 250 parts of adiponitrile in place of the iminodipropionitrile were used. The layers were again separated in the manner described in Example IV and upon distillation substantially pure tetra n-butyl titanate was produced. A yield of 73.3% based on the weight of the titanium tetrachloride introduced was obtained.

Example VI 166.2 parts of octadecyl alcohol were added to 27.8 parts of titanium tetrachloride. 100 parts of petroleum ether were then added in order to reduce viscosity of the mixture. The whole was added over a period of 30 minutes to a vessel containing 225 parts of formamide saturated with $NH_3$. The addition took place over a 30 minute interval and ammonia gas was bubbled through the solution throughout the addition period and for an additional 30 minutes thereafter. When the addition of ammonia gas was finished, the contents of the vessel were present as two clear liquid layers. The upper layer was essentially tetraoctadecyl titanate and the lower layer was formamide containing all of the $NH_4Cl$ by-product and some excess $NH_3$ dissolved therein. The products were separated as previously described and the upper layer was distilled, giving a 72% yield of tetraoctadecyl titanate in substantially pure form.

The alkyl titanates which may be prepared conveniently and economically by the processes of the instant invention are particularly useful as a starting material for the preparation of many organic compounds containing titanium. Furthermore, the alkyl titanates may be used as modifiers for various organic compositions such as paint vehicles, resins and thermal plastic compositions.

It has clearly been shown by the above description and the examples that alkyl titanate may be prepared in a simple manner according to the process of the instant invention. The alkyl titanate may be prepared by a process which eliminates the filtratiton of the alkyl titanate from the ammonium chloride formed. The process does not require careful temperature controls and normal pressures may be employed. The process eliminates the need for intricate filtration or pressure equipment. The process according to this invention is direct and economical to use.

While this invention has been described and illustrated by the examples shown, it is not intended to be strictly limited thereto and other modifications and variations may be employed within the scope of the following claims.

I claim:

1. Process for the preparation of alkyl titanate which comprises admixing alcohol, titanium tetrachloride, and ammonia thereby to form liquid alkyl titanate and ammonium chloride, and containing said ammonium chloride in a nitrogenous liquid selected from the group consisting of aliphatic amides and aliphatic nitriles, said amide or nitrile containing no more than 3 carbon atoms for each nitrogen atom present in the molecule, and separating from each other the liquid alkyl titanate and the nitrogenous liquid containing the ammonium chloride.

2. Process for the preparation of alkyl titanate which comprises admixing alcohol, titanium tetrachloride and ammonia thereby to form liquid alkyl titanate and ammonium chloride, adding nitrogenous liquid selected from the group consisting of aliphatic amides except formamide and aliphatic nitriles, said amide or nitrile containing no more than 3 carbon atoms for each nitrogen atom present in the molecule, and a solvent miscible with said alkyl titanate and immiscible with said nitrogenous liquid to form a miscible layer of alkyl titanate and said solvent and a nitrogenous liquid containing ammonium chloride, said solvent being selected and added in amount to produce a layer of alkyl titanate and said solvent of density at least 0.01 gram/cc. less than the density of the nitrogenous layer and separating the layer containing said titanate and said solvent from the liquid nitrogenous layer containing the ammonium chloride and separating by distillation the alkyl titanate from said solvent.

3. Process for the preparation of tetra n-butyl titanate which comprises admixing n-butanol, titanium tetrachloride and ammonia thereby to form liquid tetra n-butyl titanate and ammonium chloride, adding dimethylformamide and petroleum ether to obtain a miscible layer of tetra n-butyl titanate and petroleum ether and liquid dimethylformamide containing the ammonium chloride, the petroleum ether being added in amount to produce a tetra n-butyl titanate and petroleum ether layer of density at least 0.01 gram/cc. less than the density of the dimethylformamide layer containing the ammonium chloride, and separating by distillation the tetra n-butyl titanate from the petroleum ether.

4. Process for the preparation of tetra (2-ethyl butyl) titanate which comprises admixing 2-ethyl butanol, titanium tetrachloride and ammonia thereby to form liquid tetra (2-ethyl butyl) titanate and ammonium chloride, and dissolving said ammonium chloride in liquid formamide, separating by gravity the liquid formamide containing the solubilized ammonium chloride from the liquid tetra (2-ethyl butyl) titanate.

5. Process for the preparation of tetraisopropyl titanate which comprises admixing isopropyl alcohol, titanium tetrachloride and ammonia thereby to form liquid tetraisopropyl titanate and ammonium chloride, adding oxydipropionitrile to obtain a tetraisopropyl titanate layer and an oxydipropionitrile layer containing said ammonium chloride, and separating from each other the oxydipropionitrile layer and the tetraisopropyl titanate layer.

6. Process for the production of tetra-n-butyl titanate which comprises admixing n-butanol, titanium tetrachloride and ammonia thereby to form liquid tetra-n-butyl titanate and ammonium chloride, adding iminodipropionitrile and petroleum ether to obtain a miscible layer of tetra-n-butyl titanate and petroleum ether and a liquid iminodipropionitrile layer containing the ammonium chloride, the petroleum ether being added in amount to produce a tetra-n-butyl titanate and petroleum ether layer of density at least 0.01 gram/cc. less than the density of the iminodipropionitrile layer containing the ammonium chloride, and separating by distillation the tetra-n-butyl titanate from the petroleum ether.

7. Process for the preparation of n-butyl titanate which comprises admixing n-butanol, titanium tetrachloride and ammonia thereby to form liquid tetra-n-butyl titanate and ammonium chloride, adding adiponitrile and petroleum ether to obtain a miscible layer of tetra-n-butyl titanate and petroleum ether and a liquid adiponitrile layer containing the ammonium chloride, the petroleum ether being added in amount to produce a tetra-n-butyl titanate and petroleum ether layer of density at least 0.01 gram/cc. less than the density of the adiponitrile layer containing the ammonium chloride, and separating by distillation the tetra-n-butyl titanate from the petroleum ether.

8. Process for the preparation of tetraoctadecyl titanate which comprises admixing octadecyl alcohol, titanium tetrachloride and ammonia thereby to form liquid tetraoctadecyl titanate and ammonium chloride and dissolving said ammonium chloride in liquid formamide, separating by gravity the liquid formamide containing the solubilized ammonium chloride from the liquid tetraoctadecyl titanate.

9. Process for the preparation of alkyl titanate which comprises admixing alcohol, titanium tetrachloride and ammonia thereby to form liquid alkyl titanate and ammonium chloride and dissolving said ammonium chloride in liquid formamide and separating from each other the liquid alkyl titanate from liquid formamide containing the ammonium chloride.

DANIEL F. HERMAN.

References Cited in the file of this patent

UNITED STATES PATENTS

| Number | Name | Date |
| --- | --- | --- |
| 2,187,821 | Nelles | Jan. 23, 1940 |

OTHER REFERENCES

C. A.: vol. 4, p. 2597, 1910.
Speer: J. Org. Chem., vol. 63, 1949, pp. 655–659.
Winter: J. Oil & Color Chemists Association, vol. 34, pp. 30 and 31, January 1951.